US008699966B2

(12) United States Patent
Shibata et al.

(10) Patent No.: US 8,699,966 B2
(45) Date of Patent: Apr. 15, 2014

(54) HIGH-FREQUENCY SWITCH MODULE

(75) Inventors: Osamu Shibata, Nagaokakyo (JP);
Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 221 days.

(21) Appl. No.: 13/410,476

(22) Filed: Mar. 2, 2012

(65) Prior Publication Data

US 2012/0224514 A1 Sep. 6, 2012

(30) Foreign Application Priority Data

Mar. 4, 2011 (JP) ................................. 2011-047901

(51) Int. Cl.
*H04B 1/44* (2006.01)

(52) U.S. Cl.
USPC ............................................ 455/78; 333/133

(58) Field of Classification Search
USPC .................................................. 455/78, 121
See application file for complete search history.

(56) References Cited

U.S. PATENT DOCUMENTS

| 7,586,388 B2 | 9/2009 | Harada |
| 2003/0076194 A1 | 4/2003 | Machui |
| 2006/0189277 A1 | 8/2006 | Ranta et al. |
| 2010/0135193 A1 | 6/2010 | Przadka |

FOREIGN PATENT DOCUMENTS

| JP | 2003-517239 A | 5/2003 |
| JP | 2010-528498 A | 8/2010 |
| WO | 2007/138073 A2 | 12/2007 |
| WO | 2008/004396 A1 | 1/2008 |

OTHER PUBLICATIONS

Official Communication issued in corresponding German Patent Application No. 10 2012 203 215.0, mailed on Nov. 12, 2012.

*Primary Examiner* — Creighton Smith

(74) *Attorney, Agent, or Firm* — Keating & Bennett, LLP

(57) ABSTRACT

A high-frequency switch module includes a first switching element and a second switching element. A common terminal of the first switching element is connected to an antenna. A common input terminal of the second switching element is connected to a multi-band power amplifier. A second individual output terminal of the second switching element is connected to a fourth individual terminal of the first switching element via a first low-pass filter, and is connected to a third individual terminal of the first switching element via a series circuit including a second low-pass filter and a high-pass filter. A first individual output terminal of the second switching element is connected to a first individual terminal of the first switching element via a phase-shift circuit and a first SAW duplexer, and is connected to a second individual terminal of the first switching element via the phase-shift circuit and a second SAW duplexer.

5 Claims, 4 Drawing Sheets

HIGH-FREQUENCY SWITCH MODULE

BACKGROUND OF THE INVENTION

1. Field of the Invention

The present invention relates to a high-frequency module to transmit and receive a plurality of communication signals with a common antenna.

2. Description of the Related Art

Various types of high-frequency modules for transmitting and receiving, with a common antenna, a plurality of communication signals using different frequency bands have recently been developed. For example, in a high-frequency module disclosed in Japanese Unexamined Patent Application Publication No. 2010-528498, a common terminal of a distributor is connected to an antenna, and a plurality of individual terminals of the distributor are individually connected to common terminals of switching elements. Individual terminals of each of the switching elements are individually connected to a transmission signal input circuit, a receiving signal output circuit, and a transceiver circuit.

High-frequency switch modules have also recently been developed in which the distributor is not provided and a switching element connects one of a transmission signal input circuit, a receiving signal output circuit, and a transceiver circuit to an antenna. The switching element in such a high-frequency switch module must have as many individual terminals as the number of transmission signal input circuits, receiving signal output circuits, and transceiver circuits. With an increasing number of communication signals to be processed, the number of individual terminals of the switching element must be increased.

Many multi-band power amplifiers capable of amplifying communication transmission signals using different frequency bands have recently been developed, and such a multi-band power amplifier is used for a high-frequency switch module. In a case in which such a multi-band power amplifier is used, it is necessary to individually input transmission signals amplified by the multi-band power amplifier into the above-described transmission signal input circuits.

FIG. 1 is a diagram illustrating a circuit configuration of a high-frequency switch module 10P in the related art that includes a multi-band power amplifier. An exemplary high-frequency switch module is illustrated that processes a GSM 850 transmission signal (approximately 900 MHz band), a GSM 1800 transmission signal (approximately 1.8 GHz to approximately 1.9 GHz band), a GSM 1900 transmission signal (approximately 1.9 GHz to approximately 2.0 GHz band), a WCDMA-Band 1 transmission signal (approximately 2.1 GHz band), and a WCDMA-Band 8 transmission signal (approximately 900 MHz band).

As illustrated in FIG. 1, the high-frequency switch module 10P in the related art includes a switching element 11 that includes a common terminal PIC0 connected to an antenna ANT and performs switching between transmission and receiving. In addition, the high-frequency switch module 10P includes a transmission signal switching element 30P between a multi-band power amplifier 40 and the switching element 11.

A common terminal PICt0 of the transmission signal switching element 30P is connected to the multi-band power amplifier 40. As a result, a transmission signal in a predetermined frequency band amplified by the multi-band power amplifier 40 is transmitted to individual terminals PIC11 to PIC14 of the switching element 11.

An individual terminal PICt1P of the transmission signal switching element 30P is connected to the individual terminal PIC11 of the first switching element 11 via a first low-pass filter 12. As a result, a GSM 850 transmission signal amplified by the multi-band power amplifier 40 is transmitted to the individual terminal PIC11 of the switching element 11.

An individual terminal PICt2P of the transmission signal switching element 30P is connected to the individual terminal PIC12 of the switching element 11 via a second low-pass filter 13. As a result, a GSM 1800 transmission signal and a GSM 1900 transmission signal amplified by the multi-band power amplifier 40 are transmitted to the individual terminal PIC12 of the switching element 11.

An individual terminal PICt3P of the transmission signal switching element 30P is connected to the individual terminal PIC13 of the switching element 11 via a SAW duplexer 14. As a result, a WCDMA-BAND 1 transmission signal amplified by the multi-band power amplifier 40 is transmitted to the individual terminal PIC13 of the switching element 11.

An individual terminal PICt4P of the transmission signal switching element 30P is connected to the individual terminal PIC14 of the switching element 11 via a SAW duplexer 15. As a result, a WCDMA-Band 8 transmission signal amplified by the multi-band power amplifier 40 is transmitted to the individual terminal PIC14 of the switching element 11.

As described above, in the high-frequency switch module 10P in the related art, in a case in which there are transmission signals that comply with different signal specifications and use frequency bands spaced apart from each other, a number of individual terminals equal to the number of transmission signals are required in the transmission signal switching element 30P. For example, in the case of the example illustrated in FIG. 1, although the GSM 1800 transmission signal and the GSM 1900 transmission signal that comply with the same signal specification and use frequency bands close to each other can be output from a single individual terminal, it is necessary to provide individual terminals for the other transmission signals. Accordingly, with an increasing number of communication signals (transmission signals), the number of individual terminals must be increased. This increase in the number of individual terminals leads to an increase in the size and cost of a switching element. As a result, the size and cost of a high-frequency switch module are also increased.

SUMMARY OF THE INVENTION

To overcome the problems described above, preferred embodiments of the present invention provide a low-cost small high-frequency switch module even in a case in which the high-frequency switch module processes a large number of communication signals.

A preferred embodiment of the present invention provides a high-frequency switch module connected between a multi-band power amplifier to amplify a plurality of types of transmission signals and an antenna to externally output the plurality of types of transmission signals. The high-frequency switch module preferably includes a first switching element, a second switching element, and a phase-shift circuit.

The first switching element preferably includes a common terminal connected to the antenna and a plurality of individual terminals, one of which is selectively connected to the common terminal. The second switching element preferably includes a common input terminal connected to the multi-band power amplifier and a plurality of individual output terminals, one of which is selectively connected to the common input terminal.

The phase-shift circuit is connected between a first individual output terminal of the second switching element and each of a first individual terminal and a second individual terminal of the first switching element. The phase-shift circuit preferably includes an inductor and a capacitor.

An inductance value of the inductor and a capacitance value of the capacitor are preferably set so that the first individual terminal is in a substantially conductive state and the second individual terminal is in a substantially open state for a first transmission signal (for example a WCDMA-Band 1 transmission signal) output from the first individual output terminal. Furthermore, the inductance value of the inductor and the capacitance value of the capacitor are preferably set so that the first individual terminal is in a substantially open state and the second individual terminal is in a substantially conductive state for a second transmission signal (for example a WCDMA-Band 8 transmission signal) output from the first individual output terminal.

With this configuration, the need to provide an individual output terminal for each transmission signal in the second switching element including the common input terminal connected to the multi-band power amplifier is eliminated. Even in a case in which a single individual output terminal is used for a plurality of transmission signals, the transmission signals can be individually input into the individual terminals of the first switching element.

A high-frequency switch module according to a preferred embodiment of the present invention preferably has the following configuration.

The high-frequency switch module preferably further includes a first duplexer that is connected between the phase-shift circuit and the first individual terminal and is configured to distribute transmission and receiving signals including the first transmission signal for a first communication system, and a second duplexer that is connected between the phase-shift circuit and the second individual terminal and is configured to distribute transmission and receiving signals including the second transmission signal for a second communication system.

With this configuration, each of the first transmission signal and the second transmission signal passes through a phase-shift circuit and a duplexer. Accordingly, it is unnecessary to set severe characteristic adjustment conditions for the phase-shift circuit and the duplexer. As a result, it is possible to easily configure and design the phase-shift circuit and the duplexer.

A high-frequency switch module according to another preferred embodiment of the present invention preferably has the following configuration.

The second switching element preferably includes a second individual output terminal to output a third transmission signal (for example a GSM 1800 transmission signal or a GSM 1900 transmission signal) having a frequency band different from frequency bands of the first transmission signal and the second transmission signal. The frequency band of the first transmission signal and the frequency band of the second transmission signal are preferably spaced apart from each other with the frequency band of the third transmission signal therebetween.

With this configuration, the frequency bands of the first and second transmission signals input into the phase-shift circuit are spaced apart from each other. Accordingly, it is possible to easily perform the setting of an inductance and a capacitance which are necessary for the establishment of the above-described phase relationship (the relationship between a conductive state and an open state).

A high-frequency switch module according to a further preferred embodiment of the present invention preferably has the following configuration.

The second individual output terminal preferably outputs a fourth transmission signal (for example a GSM 850 transmission signal) having a frequency band different from the frequency band of the third transmission signal.

The first switching element preferably includes a third individual terminal and a fourth individual terminal. The third individual terminal is connected to the second individual output terminal via a low-pass filter having the frequency band of the third transmission signal as a pass band. The fourth individual terminal is connected to the second individual output terminal via a low-pass filter having the frequency band of the fourth transmission signal as a pass band.

A high-pass filter having a higher one of the frequency bands of the third transmission signal and the fourth transmission signal as a pass band is preferably connected between one of the low-pass filters to transmit one (for example, in the above-described case, a GSM 1800 transmission signal or a GSM 1900 transmission signal) of the third transmission signal and the fourth transmission signal having a higher frequency band and the second individual output terminal.

With this configuration, a terminal to output the third transmission signal and a terminal to output the fourth transmission signal are integrated into a single terminal in the second switching element. Accordingly, the second switching element can be reduced in size. Since two low-pass filters and a high-pass filter connected to one of the low-pass filters are provided, it is possible to individually input the third transmission signal and the fourth transmission signal into individual terminals of the first switching element.

The high-pass filter according to a preferred embodiment of the present invention is preferably configured so that a lower one (for example, in the above-described case, a GSM 850 transmission signal) of the frequency bands of the third transmission signal (for example a GSM 1800 transmission signal or a GSM 1900 transmission signal) and the fourth transmission signal (for example a GSM 850 transmission signal) is included in an attenuation band of the high-pass filter.

With this configuration, it is possible to individually input the third transmission signal and the fourth transmission signal into individual terminals of the first switching element with more certainty.

According to various preferred embodiments of the present invention, a low-cost small high-frequency switch module is provided even in a case where the high-frequency switch module is connected to a multi-band power amplifier capable of amplifying transmission signals in a plurality of frequency bands.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
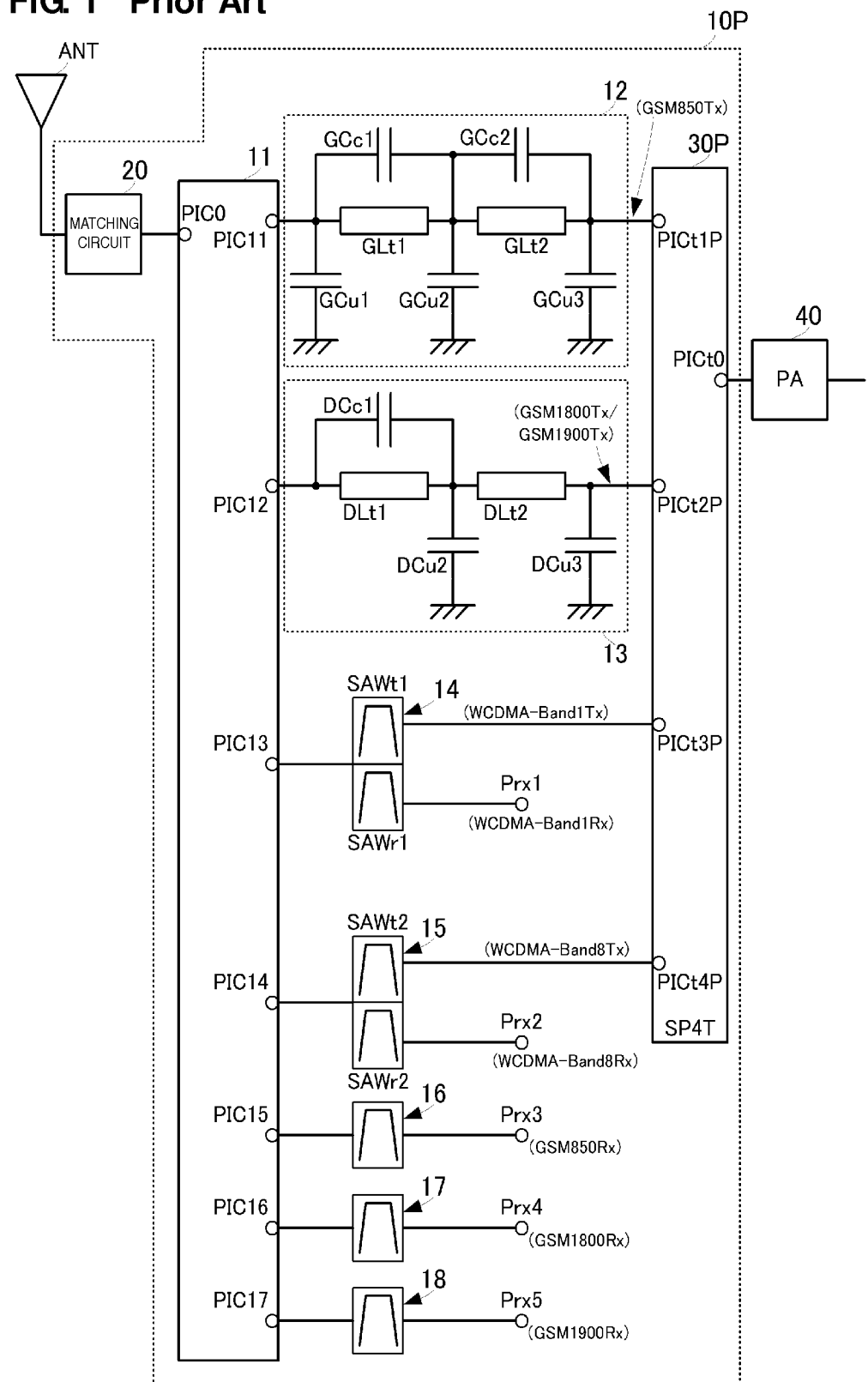
FIG. 1 is a diagram illustrating a circuit configuration of a high-frequency switch module in the related art.
Figure 2:
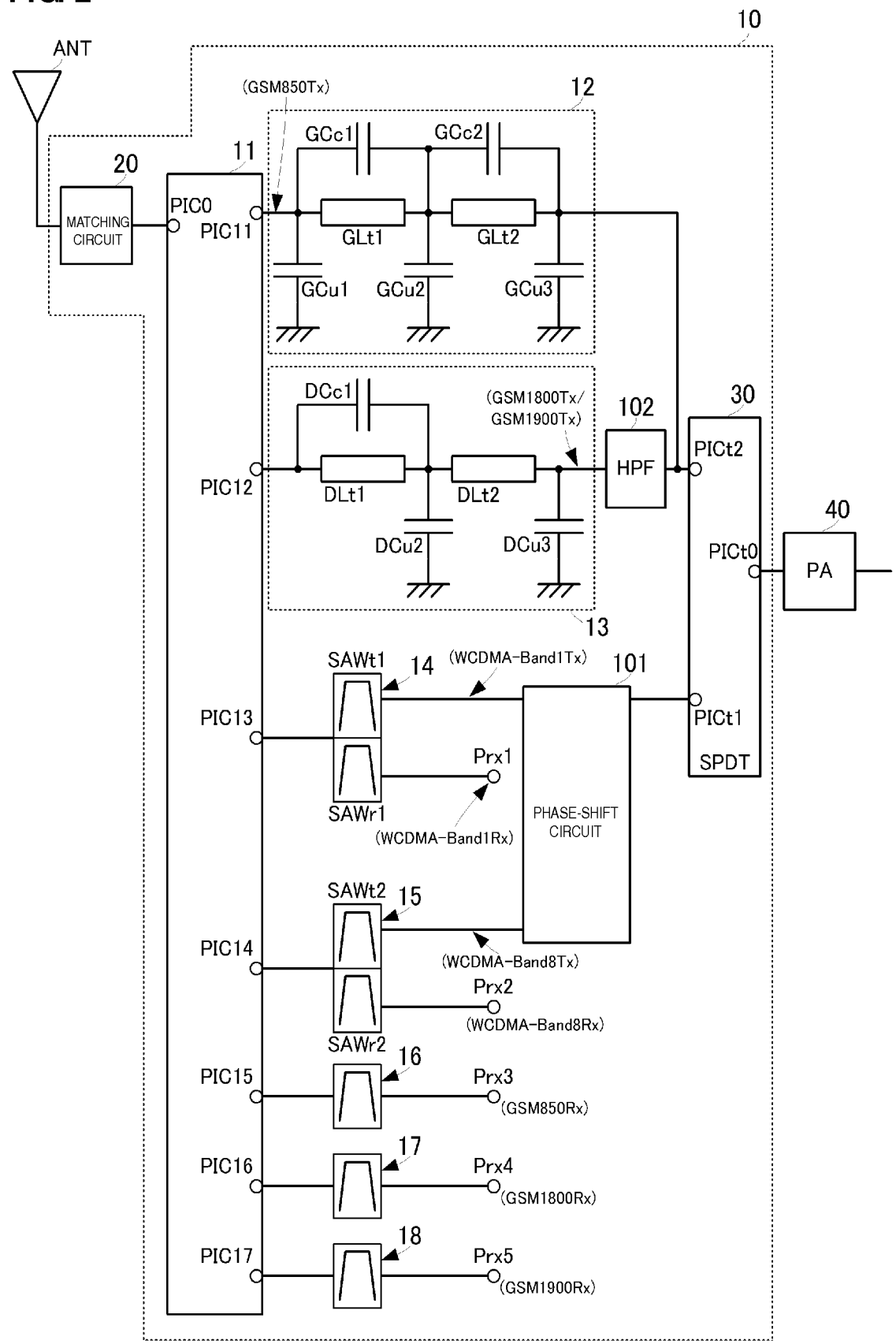
FIG. 2 is a diagram illustrating a circuit configuration of a high-frequency switch module according to a preferred embodiment of the present invention.

A high-frequency switch module 10 according to preferred embodiments of the present invention will be described with reference to the accompanying drawings. FIG. 2 is a diagram illustrating a circuit configuration of the high-frequency switch module 10 according to a preferred embodiment of the present invention. In the present preferred embodiment, a WCDMA-Band 1 communication signal is preferably used as a first communication signal, a WCDMA-Band 8 communication signal is used as a second communication signal, a GSM 1800 communication signal or a GSM 1900 communication signal is used as a third communication signal, and a GSM 850 communication signal is used as a fourth communication signal, for example. A high-frequency switch module to transmit and receive these communication signals with a single antenna ANT will be described.

First, the circuit configuration of the high-frequency switch module 10 according to this preferred embodiment will be described. The high-frequency switch module 10 preferably includes a first switching element 11, a first low-pass filter 12, a second low-pass filter 13, SAW duplexers 14 and 15, SAW filters 16, 17, and 18, an antenna-side matching circuit 20, a second switching element 30, a phase-shift circuit 101, and a high-pass filter 102.

The first switching element 11 is preferably a semiconductor switch, such as an FET, for example, and includes a single common terminal PIC0, seven individual terminals PIC11 to PIC17, a plurality of drive signal input terminals (not illustrated), and a ground connection terminal (not illustrated).

The first switching element 11 is turned on with a drive voltage input from the drive signal input terminals, and selectively connects the common terminal PIC0 to one of the individual terminals PIC11 TO PIC17 in accordance with the combination of a plurality of drive signals.

The common terminal PIC0 is connected to the antenna ANT via the antenna-side matching circuit 20.

The individual terminal PIC11 corresponds to a fourth individual terminal according to a preferred embodiment of the present invention, and is connected to an individual output terminal PICt2 of the switching element 30 via the first low-pass filter 12. The individual output terminal PICt2 corresponds to a second individual output terminal according to a preferred embodiment of the present invention.

The individual terminal PIC12 corresponds to a third individual terminal according to a preferred embodiment of the present invention, and is connected to the individual output terminal PICt2 of the switching element 30 via the second low-pass filter 13 and the high-pass filter 102.

The individual terminal PIC13 corresponds to a first individual terminal according to a preferred embodiment of the present invention, and is connected to an individual output terminal PICt1 of the switching element 30 via a transmission SAW filter SAWt1 in the SAW duplexer 14 and the phase-shift circuit 101. The individual output terminal PICt1 corresponds to a first individual output terminal according to a preferred embodiment of the present invention. A receiving SAW filter SAWr1 in the SAW duplexer 14 is connected to a receiving signal output terminal Prx1.

The individual terminal PIC14 corresponds to a second individual terminal according to a preferred embodiment of the present invention, and is connected to the individual output terminal PICt1 of the switching element 30 via a transmission SAW filter SAWt2 in the SAW duplexer 15 and the phase-shift circuit 101. A receiving SAW filter SAWr2 in the SAW duplexer 15 is connected to a receiving signal output terminal Prx2.

The individual terminal PIC15 is connected to a receiving signal output terminal Prx3 via the SAW filter 16. The individual terminal PIC16 is connected to a receiving signal output terminal Prx4 via the SAW filter 17. The individual terminal PIC17 is connected to a receiving signal output terminal Prx5 via the SAW filter 18.

The switching element 30 includes a common input terminal PICt0 in addition to the individual output terminals PICt1 and PICt2. The switching element 30 further includes a plurality of drive signal input terminals (not illustrated) and a ground connection terminal (not illustrated). The switching element 30 is turned on with a drive voltage input from the drive signal input terminals, and selectively connects the common input terminal PICt0 to one of the individual output terminals PICt1 and PICt2 in accordance with the combination of a plurality of drive signals. Thus, since the switching element 30 includes a small number of individual output terminals, a significant reduction in the size and cost of the switching element 30 is achieved.

The common input terminal PICt0 of the switching element 30 is connected to the multi-band power amplifier 40 that is arranged to amplify communication transmission signals. The multi-band power amplifier 40 may preferably be a single amplifier or a plurality of amplifiers from which signals in different frequency bands are output, for example.

The first low-pass filter 12 includes inductors GLt1 and GLt2 connected in series between the individual terminal PIC11 of the first switching element 11 and the individual output terminal PICt2 of the second switching element 30.

A capacitor GCc1 is connected in parallel to the inductor GLt1. One end of the inductor GLt1 on the side of the individual terminal PIC11 is connected to the ground via a capacitor GCu1.

A point of connection between the inductor GLt1 and the inductor GLt2 is connected to the ground via a capacitor GCu2. A capacitor GCc2 is connected in parallel to the inductor GLt2. One end of the inductor GLt2 on the side of the individual output terminal PICt2 is connected to the ground via a capacitor GCu3.

Preferably, the pass band and the attenuation band of the first low-pass filter 12 are set so that the frequencies of second-order and third-order harmonics of a transmission signal (a fourth transmission signal) corresponding to the fourth communication signal are in the attenuation band, the fundamental frequency of the fourth transmission signal is in the pass band, and frequencies higher than the fundamental frequency are in the attenuation band.

The second low-pass filter 13 includes inductors DLt1 and DLt2 that are connected in series between the individual terminal PIC12 of the first switching element 11 and the high-pass filter 102. A capacitor DCc1 is connected in parallel to the inductor DLt1.

A point of connection between the inductor DLt1 and the inductor DLt2 is connected to the ground via a capacitor DCu2. One end of the inductor DLt2 on the side of the high-pass filter 102 is connected to the ground via a capacitor DCu3.

Preferably, the pass band and the attenuation band of the second low-pass filter 13 are set so that the fundamental frequency of a transmission signal (a third transmission signal) corresponding to the third communication signal is in the pass band and frequencies higher than the fundamental frequency are in the attenuation band.

The SAW duplexer 14 includes the transmission SAW filter SAWt1 and the receiving SAW filter SAWr1. In the transmission SAW filter SAWt1, preferably, the fundamental frequency band of a transmission signal (first transmission signal) corresponding to the first communication signal is set as a pass band, and bands lower and higher than the pass band are set as an attenuation band. In the receiving SAW filter SAWr1, preferably, the fundamental frequency band of a receiving signal (a first receiving signal) corresponding to the first communication signal is set as a pass band, and bands lower and higher than the pass band are set as an attenuation band.

The SAW duplexer 15 includes the transmission SAW filter SAWt2 and the receiving SAW filter SAWr2. In the transmission SAW filter SAWt2, preferably, the fundamental frequency band of a transmission signal (a second transmission signal) corresponding to the second communication signal is set as a pass band, and bands lower and higher than the pass band are set as an attenuation band. In the receiving SAW filter SAWr2, preferably, the fundamental frequency band of a receiving signal (a second receiving signal) corresponding to the second communication signal is set as a pass band, and bands lower and higher than the pass band are set as an attenuation band.

In the SAW filter 16, preferably, the fundamental frequency band of a receiving signal (a fourth receiving signal) corresponding to the fourth communication signal is set as a pass band, and bands lower and higher than the pass band are set as an attenuation band.

In each of the SAW filters 17 and 18, preferably, the fundamental frequency band of a receiving signal (a third receiving signal) corresponding to the third communication signals is set as a pass band, and bands lower and higher than the pass band are set as an attenuation band. For example, in the SAW filter 17, the fundamental frequency band of a receiving signal corresponding to a GSM 1800 communication signal that is one of the third communication signals is set as a pass band, and bands lower and higher than the pass band are set as an attenuation band. On the other hand, in the SAW filter 18, the fundamental frequency band of a receiving signal corresponding to a GSM 1900 communication signal that is the other one of the third communication signals is set as a pass band, and bands lower and higher than the pass band are set as an attenuation band.

In a case in which each of the transmission signals is transmitted from the antenna ANT in the high-frequency switch module 10 having the above-described configuration, the following control processing is performed. With the phase-shift circuit 101 and the high-pass filter 102 according to this preferred embodiment, it is possible to classify the transmission signals amplified by the multi-band power amplifier 40 and transmit the transmission signals from the antenna ANT with certainty.

(i) Transmission of First Transmission Signal (WCDMA-Band 1 Transmission Signal)

In a case in which the first transmission signal is transmitted, the individual terminal PIC13 and the common terminal PIC0 are connected in the first switching element 11. In the second switching element 30, the common input terminal PICt0 and the individual output terminal PICt1 are connected.

The first transmission signal amplified by the multi-band power amplifier 40 is input into the phase-shift circuit 101 via the second switching element 30.

Figure 3:
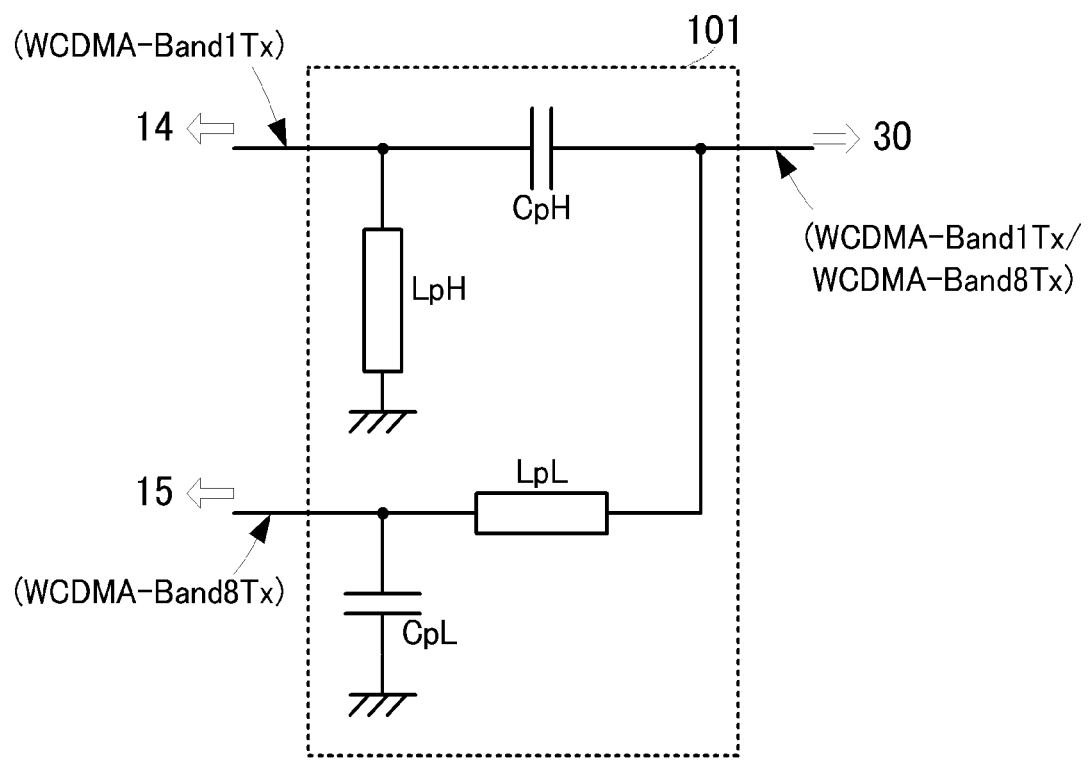
FIG. 3 is a circuit diagram of a phase-shift circuit according to a preferred embodiment of the present invention.

FIG. 3 is a circuit diagram of the phase-shift circuit 101 according to the present preferred embodiment. The phase-shift circuit 101 preferably includes a capacitor CpH connected between the second switching element 30 and the transmission SAW filter SAWt1 in the SAW duplexer 14. One end of the capacitor CpH on the side of the SAW duplexer 14 is connected to the ground via an inductor LpH.

The phase-shift circuit 101 preferably further includes an inductor LpL connected between the second switching element 30 and the transmission SAW filter SAWt2 in the SAW duplexer 15. On end of the inductor LpL on the side of the SAW duplexer 15 is connected to the ground via a capacitor CpL.

In the phase-shift circuit 101, the inductances of the inductors LpH and LpL and the capacitances of the capacitors CpH and CpL are set so that the transmission SAW filter SAWt1 in the SAW duplexer 14 is in a conductive state and the transmission SAW filter SAWt2 in the SAW duplexer 15 is in an open state as viewed from the second switching element 30 at the fundamental frequency of the first transmission signal. In addition, in the phase-shift circuit 101, the inductances of the inductors LpH and LpL and the capacitances of the capacitors CpH and CpL are set so that the transmission SAW filter SAWt1 in the SAW duplexer 14 is in an open state and the transmission SAW filter SAWt2 in the SAW duplexer 15 is in a conductive state as viewed from the second switching element 30 at the fundamental frequency of the second transmission signal.

With the high-frequency switch module 10 configured as described above, the first transmission signal output from the individual output terminal PICt1 of the second switching element 30 is transmitted to the transmission SAW filter SAWt1 in the SAW duplexer 14 and is not transmitted to the transmission SAW filter SAWt2 in the SAW duplexer 15. Accordingly, since the first transmission signal having relatively large power is not transmitted over a transmission path different from a proper transmission path, the adverse effect of the first transmission signal on the characteristic of the high-frequency switch module 10 is effectively minimized or prevented.

Thus, the first transmission signal that has passed through the phase-shift circuit 101 passes through the transmission SAW filter SAWt1 in the SAW duplexer 14 and is input into the individual terminal PIC13 of the first switching element 11. Since the first transmission signal is transmitted over the above-described path, the frequency of each higher harmonic of the first transmission signal is attenuated in the transmission SAW filter SAWt1 in the SAW duplexer 14 and the higher harmonic is not transmitted to the individual terminal PIC13 of the first switching element 11. Furthermore, by bringing the phase-shift circuit 101 into a substantially open state as viewed from the individual output terminal PICt1 of the second switching element 30 at the frequency of each higher harmonic of the first transmission signal, it is possible to more effectively minimize or prevent a higher harmonic input into the individual terminal PIC13 of the first switching element 11.

Thus, the first transmission signal that has been transmitted to the first switching element 11 is output from the common terminal PIC0 of the first switching element 11 and is externally transmitted from the antenna ANT.

(ii) Transmission of Second Transmission Signal (WCDMA-Band 8 Transmission Signal)

In a case in which the second transmission signal is transmitted, the individual terminal PIC14 and the common terminal PIC0 are connected in the first switching element 11. In the second switching element 30, the common input terminal PICt0 and the individual output terminal PICt1 are connected.

The second transmission signal amplified by the multi-band power amplifier 40 is input into the phase-shift circuit 101 via the second switching element 30.

Since the phase setting of the phase-shift circuit 101 is performed as described above, the second transmission signal output from the individual output terminal PICt1 of the second switching element 30 is transmitted to the transmission SAW filter SAWt2 in the SAW duplexer 15, and is not transmitted to the transmission SAW filter SAWt1 in the SAW duplexer 14.

Accordingly, since the second transmission signal having large power is not transmitted over a transmission path different from a proper transmission path, the adverse effect of the second transmission signal on the characteristic of the high-frequency switch module 10 is minimized or prevented.

Thus, the second transmission signal that has passed through the phase-shift circuit 101 passes through the transmission SAW filter SAWt2 in the SAW duplexer 15 and is input into the individual terminal PIC14 of the first switching element 11. Since the second transmission signal is transmitted over the above-described path, the frequency of each higher harmonic of the second transmission signal is attenuated in the transmission SAW filter SAWt2 in the SAW duplexer 15 and the higher harmonic is not transmitted to the individual terminal PIC14 of the first switching element 11. Furthermore, by bringing the phase-shift circuit 101 into a substantially open state as viewed from the individual output terminal PICt1 of the second switching element 30 at the frequency of each higher harmonic of the second transmission signal, it is possible to more effectively minimize or prevent a higher harmonic input into the individual terminal PIC14 of the second switching element 11.

The second transmission signal that has been transmitted to the first switching element 11 is output from the common terminal PIC0 of the first switching element 11 and is externally transmitted from the antenna ANT.

With the phase-shift circuit 101 according to this preferred embodiment, the number of individual output terminals of the second switching element 30 connected to the output terminal of the multi-band power amplifier 40 can be reduced to less than the number of transmission signals as described in portions (i) and (ii) above. Therefore, the size and cost of the second switching element 30 is significantly reduced. As described above, the newly added phase-shift circuit 101 preferably includes inductors and capacitors which are used for phase adjustment. By forming the high-frequency switch module 10 as a laminate, the phase-shift circuit 101 can be defined by inner-layer electrode patterns of the laminate. Accordingly, the addition of the phase-shift circuit 101 does not lead to an increase in the size and cost of the high-frequency switch module 10.

Since SAW filters are disposed at a stage subsequent to the phase-shift circuit on transmission paths of transmission signals as described above, the operational effects can be sufficiently obtained even when the phase-shift circuit does not accurately perform phase adjustment, that is, a conductive state is not accurately set for a transmission signal expected to be transmitted and an open state is not accurately set for a transmission signal expected to be blocked. As a result, design flexibility is improved, and significant size reduction and cost reduction are easily achieved.

In a case in which the phase-shift circuit 101 is not provided, a large-power transmission signal that should not be transmitted or the harmonic of each transmission signal is directly input into the SAW duplexers 14 and 15. By providing the phase-shift circuit 101, only a transmission signal that should be transmitted is input into the SAW duplexers 14 and 15. Accordingly, it is possible to minimize or prevent an adverse effect on the SAW duplexers 14 and 15 and prevent the SAW duplexers 14 and 15 from being damaged or broken. Furthermore, the attenuation characteristics of the transmission SAW filter SAWt1 in the SAW duplexer 14 and the transmission SAW filter SAWt2 in the SAW duplexer 15 can be easily designed in view of the relationship with the phase characteristic of the phase-shift circuit 101.

In the above-described example of a preferred embodiment of the present invention, a WCDMA-Band 1 transmission signal (2.1 GHz band) is preferably used as the first transmission signal and a WCDMA-Band 8 transmission signal (900 MHz band) is preferably used as the second transmission signal. Thus, in a case in which frequency bands of two types of transmission signals passing through the phase-shift circuit 101 are spaced apart from each other, the above-described phase setting can be easily performed. Accordingly, the phase-shift circuit 101 can be easily obtained.

(iii) Transmission of Third Transmission Signal (GSM 1800 Transmission Signal or GSM 1900 Transmission Signal)

In a case in which the third transmission signal is transmitted, the individual terminal PIC12 and the common terminal PIC0 are connected in the first switching element 11. In the second switching element 30, the common input terminal PICt0 and the individual output terminal PICt2 are connected.

The third transmission signal amplified by the multi-band power amplifier 40 is input into the first low-pass filter 12 and the high-pass filter 102 via the second switching element 30.

As described above, the fundamental frequency of the fourth transmission signal (GSM 850 transmission signal) is in the pass band of the first low-pass filter 12, and a frequency band higher than the fundamental frequency is set as the attenuation band of the first low-pass filter 12. Accordingly, the first low-pass filter 12 blocks the third transmission signal.

Figure 4:
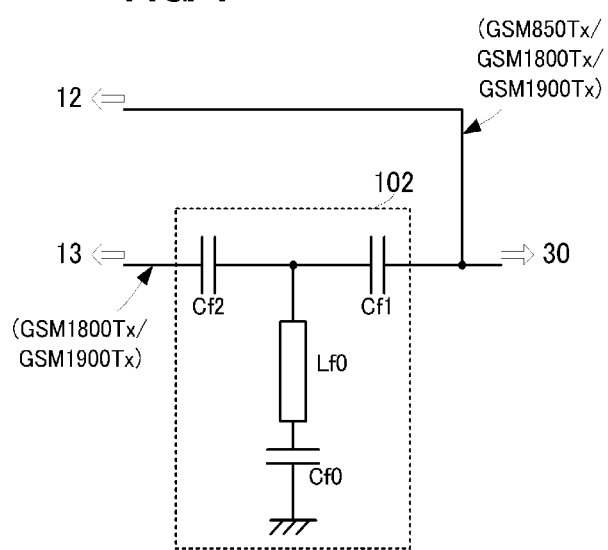
FIG. 4 is a circuit diagram of a high-pass filter (HPF) according to a preferred embodiment of the present invention.

FIG. 4 is a circuit diagram of the high-pass filter 102 according to the present preferred embodiment. The high-pass filter 102 preferably includes capacitors Cf1 and Cf2 connected in series between the individual output terminal PICt2 of the second switching element 30 and the second low-pass filter 13. A point of connection between the capacitors Cf1 and Cf2 is connected to the ground via a series circuit of an inductor Lf0 and a capacitor Cf0.

The capacitances of the capacitors Cf0, Cf1, and Cf2 and the inductance of the inductor Lf0 are preferably set as appropriate so that the fundamental frequency of the third transmission signal is included in the pass band of the high-pass filter 102 and the fundamental frequency of the fourth transmission signal is included in the attenuation band of the high-pass filter 102.

Accordingly, the third transmission signal passes through the high-pass filter 102 and is input into the second low-pass filter 13. As described above, the fundamental frequency of the third transmission signal is in the pass band of the second low-pass filter 13 and the frequency band of a higher harmonic of the third transmission signal is in the attenuation band of the second low-pass filter 13. Accordingly, the third transmission signal passes through the second low-pass filter 13 and is input into the individual terminal PIC12 of the first switching element 11. The third transmission signal that has been transmitted to the first switching element 11 is output from the common terminal PIC0 of the first switching element 11 and is externally transmitted from the antenna ANT.

(iv) Transmission of Fourth Transmission Signal (GSM 850 Transmission Signal)

In a case in which the fourth transmission signal is transmitted, the individual terminal PIC11 and the common terminal PIC0 are connected in the first switching element 11. In the second switching element 30, the common input terminal PICt0 and the individual output terminal PICt2 are connected.

The fourth transmission signal amplified by the multi-band power amplifier 40 is input into the first low-pass filter 12 and the high-pass filter 102 via the second switching element 30.

As described above, the fundamental frequency of the fourth transmission signal (GSM 850 transmission signal) is in the pass band of the first low-pass filter 12 and a band higher than the fundamental frequency is in the attenuation band of the first low-pass filter 12. Accordingly, the first low-pass filter 12 transmits the fourth transmission signal.

As described previously, the fundamental frequency of the third transmission signal is in the pass band of the high-pass filter 102 and the fundamental frequency of the fourth transmission signal is in the attenuation band of the high-pass filter 102. Accordingly, the high-pass filter 102 blocks the fourth transmission signal.

The fourth transmission signal passes through the first low-pass filter 12 and is input into the individual terminal PIC11 of the first switching element 11. The fourth transmission signal that has been transmitted to the first switching element 11 is output from the common terminal PIC0 of the first switching element 11 and is externally transmitted from the antenna ANT.

With the high-pass filter 102 according to the present preferred embodiment, the number of individual output terminals of the second switching element 30 connected to the output terminal of the multi-band power amplifier 40 is reduced to less than the number of transmission signals as described in the cases (iii) and (iv). It is therefore possible to reduce the size and cost of the second switching element 30. The addition of the high-pass filter 102 does not increase the size and cost of the high-frequency switch module 10 as in the case of the phase-shift circuit 101.

As described previously, since the first low-pass filter 12 not only has a function of attenuating the harmonic of the fourth transmission signal but also a function of attenuating the third transmission signal, the third transmission signal and the fourth transmission signal can be input into the individual terminals PIC12 and PIC11 of the first switching element 11, respectively, without providing a low-pass filter that is paired with the high-pass filter 102. As a result, the size of the high-frequency switch module 10 can be further reduced.

A high-frequency switch module arranged to process four types of transmission signals (communication signals) has been described. A high-frequency switch module arranged to process at least three types of transmission signals (communication signals) may also preferably have the above-described configuration. In particular, in a case in which three types of transmission signals are used, preferably the transmission circuit including the high-pass filter 102 is removed and two of the transmission signals between which the farthest distance is obtained are output from a single individual output terminal.

An exemplary case in which the high-pass filter 102 having an attenuation pole is used has been described. However, a simple high-pass filter having no attenuation pole may preferably be used.

The above-described combination of communication signals is merely illustrative, and other communication signals can be used as long as the above-described frequency band relationship is obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency switch module connected between a multi-band power amplifier arranged to amplify a plurality of types of transmission signals and an antenna arranged to externally output the plurality of types of transmission signals, comprising:
    a first switching element including a common terminal connected to the antenna and a plurality of individual terminals, one of which is selectively connected to the common terminal;
    a second switching element including a common input terminal connected to the multi-band power amplifier and a plurality of individual output terminals, one of which is selectively connected to the common input terminal; and
    a phase-shift circuit connected between a first individual output terminal of the plurality of individual output terminals of the second switching element and each of a first individual terminal and a second individual terminal of the plurality of individual terminals of the first switching element; wherein
    the phase-shift circuit includes an inductor and a capacitor; and
    an inductance value of the inductor and a capacitance value of the capacitor are set so that the first individual terminal is in a substantially conductive state and the second individual terminal is in a substantially open state for a first transmission signal output from the first individual output terminal, and the first individual terminal is in a substantially open state and the second individual terminal is in a substantially conductive state for a second transmission signal output from the first individual output terminal.

2. The high-frequency switch module according to claim 1, further comprising:
    a first duplexer connected between the phase-shift circuit and the first individual terminal and configured to distribute transmission and receiving signals including the first transmission signal for a first communication system; and
    a second duplexer connected between the phase-shift circuit and the second individual terminal and configured to distribute transmission and receiving signals including the second transmission signal for a second communication system.

3. The high-frequency switch module according to claim 1, wherein
    the second switching element includes a second individual output terminal of the plurality of individual output terminals arranged to output a third transmission signal having a frequency band different from frequency bands of the first transmission signal and the second transmission signal; and
    the frequency band of the first transmission signal and the frequency band of the second transmission signal are spaced apart from each other with the frequency band of the third transmission signal therebetween.

4. The high-frequency switch module according to claim 3, wherein
    the second individual output terminal outputs a fourth transmission signal having a frequency band different from the frequency band of the third transmission signal;
    the first switching element includes a third individual terminal of the plurality of individual terminals connected to the second individual output terminal via a low-pass filter having the frequency band of the third transmission signal as a pass band and a fourth individual terminal connected to the second individual output terminal via a low-pass filter having the frequency band of the fourth transmission signal as a pass band; and a high-pass filter having a higher one of the frequency bands of the third transmission signal and the fourth transmission signal as a pass band is connected between one of the low-pass filters to transmit one of the third transmission signal and the fourth transmission signal having a higher frequency band and the second individual output terminal.

5. The high-frequency switch module according to claim 4, wherein the high-pass filter is configured so that a lower one of the frequency bands of the third transmission signal and the fourth transmission signal is included in an attenuation band of the high-pass filter.

\* \* \* \* \*